United States Patent
Uehara et al.

(10) Patent No.: US 9,599,187 B2
(45) Date of Patent: Mar. 21, 2017

(54) DAMPER DEVICE

(71) Applicant: EXEDY Corporation, Neyagawa-shi, Osaka (JP)

(72) Inventors: Hiroshi Uehara, Neyagawa (JP); Yoshinari Yoshimura, Neyagawa (JP); Takeshi Senoue, Neyagawa (JP)

(73) Assignee: EXEDY Corporation, Osaka (JP)

( * ) Notice: Subject to any disclaimer, the term of this patent is extended or adjusted under 35 U.S.C. 154(b) by 0 days.

(21) Appl. No.: 14/622,042

(22) Filed: Feb. 13, 2015

(65) Prior Publication Data

US 2015/0240910 A1   Aug. 27, 2015

(30) Foreign Application Priority Data

Feb. 27, 2014   (JP) ................. 2014-037397

(51) Int. Cl.
*F16F 15/123* (2006.01)
*F16F 15/134* (2006.01)

(52) U.S. Cl.
CPC .. *F16F 15/12373* (2013.01); *F16F 15/12333* (2013.01); *F16F 15/13446* (2013.01)

(58) Field of Classification Search
CPC ........... F16F 15/12366; F16F 15/12373; F16F 15/1245; F16F 15/1338; F16F 15/1343; F16F 15/13446; F16F 15/13484; F16F 15/13492; F16F 15/30; F16F 15/12333; F16F 15/137
USPC .............................. 464/68.9–68.92
See application file for complete search history.

(56) References Cited

U.S. PATENT DOCUMENTS

| | | | | |
|---|---|---|---|---|
| 5,146,811 A | * | 9/1992 | Jackel ..................... | 464/68.3 |
| 5,669,478 A | * | 9/1997 | Schierling et al. ........ | 192/70.17 |
| 5,826,689 A | * | 10/1998 | Bochot ..................... | 192/70.17 |
| 5,944,610 A | * | 8/1999 | Sudau ...................... | 464/24 |
| 6,386,981 B1 | * | 5/2002 | Birk et al. ................ | 464/68.1 |

FOREIGN PATENT DOCUMENTS

JP   2012-159111 A   8/2012

OTHER PUBLICATIONS

Translation of JP 2012-159111 A. Fujita, et al. Torsion damper apparatus has spring retainer that controls displacement to radial direction outer side of each edge portion by side of intermediate spring bearing unit among pair of coil springs. Aug. 23, 2012.*

* cited by examiner

*Primary Examiner* — Josh Skroupa
(74) *Attorney, Agent, or Firm* — Global IP Counselors, LLP

(57) ABSTRACT

A damper device includes a first rotary member, a second rotary member, a plurality of coil springs, an intermediate member and a positioning structure. The first rotary member is a member into which a power of an engine is inputted. The second rotary member is disposed to be rotatable with respect to the first rotary member. The plurality of coil springs are configured to be compressed between the first rotary member and the second rotary member. The intermediate member is engaged with the plurality of coil springs and couples the plurality of coil springs together. The positioning structure radially positions the intermediate member with respect to at least either of the first rotary member and the second rotary member on an inner peripheral side.

8 Claims, 4 Drawing Sheets

DAMPER DEVICE

CROSS-REFERENCE TO RELATED APPLICATIONS

This application claims priority under 35 U.S.C. §119(a) to Japanese Patent Application No. JP2014-37397 filed on Feb. 27, 2014, the entirety of which is hereby incorporated by reference in its entirety.

BACKGROUND

Field of Invention

The present invention relates to a damper device.

Background Information

Various devices are installed in a drivetrain of a vehicle to transmit power generated in an engine to a transmission. A damper device and a flywheel assembly can be exemplified as these types of devices. Damper devices are used for these devices in order to attenuate rotary vibrations (see Japan Laid-open Patent Application Publication No. JP-A-2012-159111).

The aforementioned damper device mainly includes an input-side rotary member (a first side plate and a second side plate), an output-side rotary member (a center plate), a plurality of coil springs to be compressed between the first side plate and the center plate, and an intermediate plate for coupling the coil springs.

In this type of damper device, the intermediate plate is disposed on the outer peripheral side of the plurality of coil springs, and is supported only by the plurality of coil springs. The construction that the intermediate plate is supported only by the plurality of coil springs may result in that when the damper device is activated, the intermediate plate is repeatedly moved in the radial direction by variation in torque and so forth. Further, when the intermediate plate is repeatedly moved in the radial direction, the plurality of coil springs are hindered from being stably activated in the circumferential direction. Consequently, the torsional characteristics of the damper device can become instable.

SUMMARY

It is an object of the present invention to stably activate a damper device.

A damper device according to a first exemplary embodiment of the present invention includes a first rotary member, a second rotary member, a plurality of coil springs, an intermediate member and a positioning structure. The first rotary member is a member into which a power of an engine is inputted. The second rotary member is disposed to be rotatable with respect to the first rotary member. The plurality of coil springs are configured to be compressed between the first rotary member and the second rotary member. The intermediate member is configured to engage with the respective coil springs and couples the coil springs. The positioning structure is configured to position radially the intermediate member with respect to at least either of the first rotary member and the second rotary member on an inner peripheral side.

In the present damper device, when inputted into the first rotary member, the power of the engine is sequentially transmitted to the first rotary member, the intermediate member and the second rotary member in this order. In the power transmission path, the plurality of coil springs are configured to be compressed between the first rotary member and the second rotary member through the intermediate member, while the positioning structure radially positions the intermediate member.

Thus in the present damper device, the positioning structure radially positions the intermediate member. Hence, the plurality of coil springs can be stably compressed. Put differently, the damper device can be stably activated.

A damper device according to a second exemplary embodiment of the present invention relates to the damper device of the first exemplary embodiment, and wherein the first rotary member is provided with a support part for supporting an inner peripheral part of the intermediate member. Further, the positioning structure is configured by the inner peripheral part of the intermediate member and the support part.

In the present damper device, the support part provided for the first rotary member supports the inner peripheral part of the intermediate member. In other words, the positioning structure radially positions the intermediate member. Thus, the plurality of coil springs can be stably compressed. Put differently, the damper device can be stably activated.

A damper device according to a third exemplary embodiment of the present invention relates to the damper device of the second exemplary embodiment, and wherein the first rotary member has a coupling part for coupling the first rotary member to the engine. Further, the support part is a reinforcement member for reinforcing the coupling part.

In the present damper device, the reinforcement member provided for the first rotary member supports the inner peripheral part of the intermediate member. By thus using the reinforcement member as the positioning structure, the intermediate member can be radially positioned without preparing a special member.

A damper device according to a fourth exemplary embodiment of the present invention relates to the damper device of the first exemplary embodiment, and wherein the intermediate member has a body and a protruding part axially protruding from the body. Further, the second rotary member has a support part capable of supporting the protruding part. Yet further, the positioning structure is formed by the protruding part and the support part.

In the present damper device, the support part of the second rotary member supports the protruding part of the intermediate member. In other words, the positioning structure radially positions the intermediate member. Thus, the plurality of coil springs can be stably compressed. Put differently, the damper device can be stably activated.

A damper device according to a fifth exemplary embodiment of the present invention relates to the damper device of the fourth exemplary embodiment, and wherein the protruding part is formed by bending an inner peripheral part of the body. Further, an inner peripheral part of the support part supports an outer peripheral part of the protruding part.

In the present damper device, the protruding part can be easily formed only by bending the inner peripheral part of the body. Put differently, the intermediate member can be easily positioned in the radial direction without preparing a special member.

Moreover, the inner peripheral part of the support part of the second rotary member supports the outer peripheral part of the protruding part of the intermediate member. Put differently, even when centrifugal force acts on the intermediate member, the inner peripheral part of the support part of the second rotary member restricts (radial) movement of the outer peripheral part of the protruding part of the intermediate member. Even with the construction, the intermediate member can be radially positioned by the positioning structure.

A damper device according to a sixth exemplary embodiment of the present invention relates to the damper device of the first to fifth exemplary embodiments, and wherein the first rotary member, the intermediate member and the second rotary member are disposed on the inner peripheral side to be axially aligned in a sequential order of the first rotary member, the intermediate member and the second rotary member.

In the present damper device, the first rotary member, the intermediate member and the second rotary member are disposed on the inner peripheral side to be axially aligned in this order. On the other hand, there is a well-known construction that the first rotary member, the second rotary member and the intermediate member are axially disposed in this order. In the well-known construction, to fix the second rotary member onto an output shaft coupled to a transmission, the inner peripheral part of the second rotary member is required to be greatly bent toward the transmission in comparison with the intermediate member. By contrast, in the present damper device, the inner peripheral part of the second rotary member is not required to be greatly bent toward the transmission. Hence, the respective members composing the damper device can be formed with simple shapes. Thus, reduction in weight of the damper device can be achieved.

Overall, according to the exemplary embodiments of the present invention, the damper device can be stably activated.

BRIEF DESCRIPTION OF THE DRAWINGS

Referring now to the attached drawings which form a part of this original disclosure.

DETAILED DESCRIPTION OF EXEMPLARY EMBODIMENTS

First Exemplary Embodiment

Entire Construction

Figure 1:
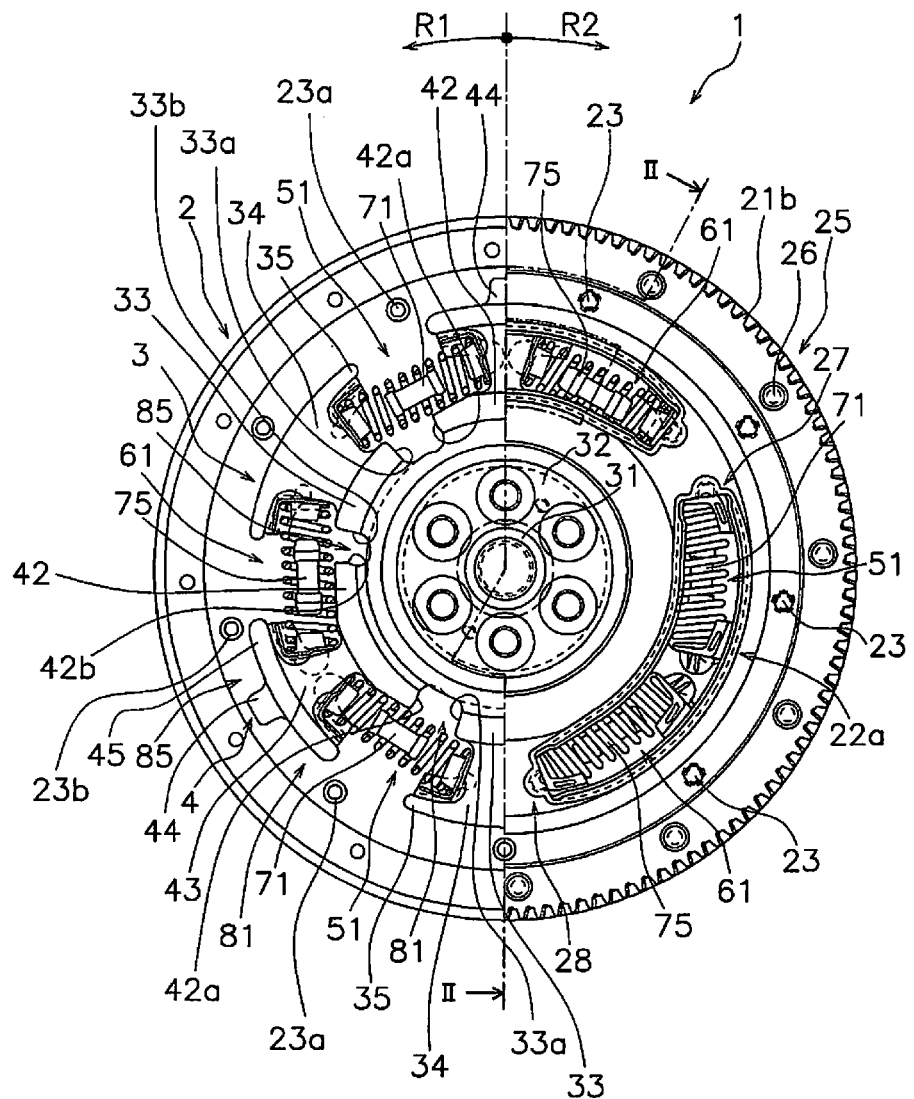
FIG. 1 is a side view of a flywheel assembly according to a first exemplary embodiment of the present invention.

A flywheel assembly 1 (an exemplary damper device) will be hereinafter explained with reference to FIGS. 1 and 2. The flywheel assembly 1 is a device for transmitting power generated by an engine to a transmission.

The flywheel assembly 1 includes an input plate 2 (an exemplary first rotary member), an output plate 3 (an exemplary second rotary member), low stiffness springs 51 (exemplary first coil springs), high stiffness springs 61 (exemplary second coil springs), a support plate 4 (an exemplary intermediate member), a first stopper mechanism 81, a second stopper mechanism 85, first shock absorber members 71 (exemplary first contact relief members), second shock absorber members 75 (exemplary second contact relief members) and a positioning structure 90. The input plate 2, the support plate 4 and the output plate 3 are disposed on the inner peripheral side in this sequential order in an axial direction from an engine side to a transmission side.

Input Plate

Power of the engine is inputted into the input plate 2. Put differently, the input plate 2 is a member into which power generated by the engine is inputted. The input plate 2 is disposed on the engine side. The input plate 2 is fixed to a crankshaft (not shown in the drawings) of the engine.

The input plate 2 includes a first plate 21, a second plate 22 and coupling members 23. The first plate 21 is disposed on the engine side. The first plate 21 has coupling parts 21*a* in the inner peripheral part thereof to couple the first plate 21 to the engine.

A reinforcement member 24 is mounted to the coupling parts 21*a* to reinforce the coupling parts 21*a*. For example, the coupling parts 21*a* are apertures, whereas the reinforcement member 24 is a spacer. Fixture members, such as fixture bolts (not shown in the drawings) or rivets, are inserted through the apertures 21*a*. When described in detail, the fixture bolts or rivets are inserted through the apertures 21*a*, while the spacer 24 is disposed between the apertures 21*a* and the head parts of the fixture bolts or rivets. The first plate 21 is thus fixed to the crankshaft of the engine.

A pair of ring members 25 is fixed to the outer peripheral part of the first plate 21 by fixture members, such as rivets 26. One of the ring members 25 has a serrated part 21*b* formed on the outer peripheral part thereof to initiate an action of the input plate 2 (the first plate 21). It should be noted that the serrated part 21*b* may be integrally formed on the outer peripheral part of the first plate 21.

Figure 2:
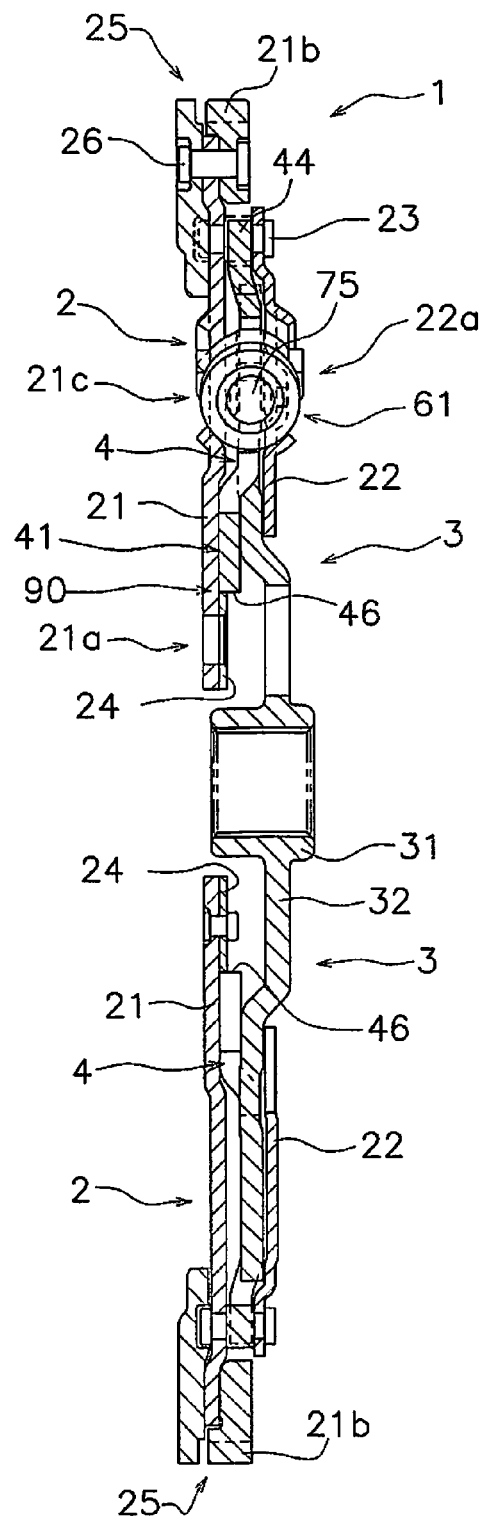
FIG. 2 is a cross-sectional view of FIG. 1 taken along a cutaway line II-II.

The first plate 21 has a plurality of window parts 21*c* (see FIG. 2). When described in detail, the plurality (e.g., three) of window parts 21*c* are bored in the first plate 21 to be circumferentially aligned at predetermined intervals. Each window part 21*c* accommodates one low stiffness spring 51 and one high stiffness spring 61. One end of the low stiffness spring 51 contacts one circumferential end of each window part 21*c* through one spring sheet. On the other hand, one end of the high stiffness spring 61 contacts the other circumferential end of each window part 21*c* through another spring sheet.

The second plate 22 is disposed on the transmission side to be opposed to the first plate 21. When described in detail, the second plate 22 is disposed axially away from the first plate 21 at a predetermined interval. The outer peripheral part of the second plate 22 is fixed to the first plate 21 by the coupling members 23. Thus, the second plate 22 is unitarily rotatable with the first plate 21.

The second plate 22 has a plurality of window parts 22*a*. When described in detail, the plurality (e.g., three) of window parts 22*a* are bored in the second plate 22 to be circumferentially aligned at predetermined intervals. The window parts 22*a* of the second plate 22 are respectively disposed to be axially opposed to the window parts 21*c* of the first plate 21. Each window part 22*a* accommodates one low stiffness spring 51 and one high stiffness spring 61. The one end of the low stiffness spring 51 contacts one circumferential end of each window part 22*a* through the aforementioned one spring sheet. On the other hand, the one end of the high stiffness spring 61 contacts the other circumferential end of each window part 22*a* through the aforementioned another spring sheet.

The coupling members 23 couple the first plate 21 and the second plate 22. Specifically, the coupling members 23 (e.g., rivets) couple the first plate 21 and the second plate 22 in a condition that the first plate 21 and the second plate 22 are disposed axially away from each other at a predetermined interval.

Further, some of the coupling members 23 are contactable to the support plate 4 between the first plate 21 and the second plate 22. This contact restricts rotation of the support plate 4. Specifically, those coupling members 23 contactable to the support plate 4 are disposed on both sides of the support plate 4 (respective rotation restriction parts 44 to be described) in the circumferential direction. It should be noted that in FIGS. 1 and 2, a reference sign 23 is only assigned to those coupling members 23 contactable to the support plate 4.

As described above, the one end of each low stiffness spring 51 contacts the one end of each pair of opposed window parts 21c and 22a of the first and second plates 21 and 22 through the aforementioned one spring sheet. On the other hand, the one end of each high stiffness spring 61 contacts the other end of each pair of opposed window parts 21c and 22a of the first and second plates 21 and 22 through the aforementioned another spring sheet. In the following explanation, the one end of each pair of opposed window parts 21c and 22a to be contacted to each low stiffness spring 51 will be referred to as "a first pressing part 27", whereas the other end of each pair of opposed window parts 21c and 22a to be contacted to each high stiffness spring 61 will be referred to as "a second pressing part 28".

Output Plate

The output plate 3 outputs the power of the engine to the transmission. The output plate 3 is disposed to be rotatable with respect to the input plate 2. The output plate 3 is fixed to an output shaft (not shown in the drawings) coupled to the transmission.

The output plate 3 has a cylindrical part 31, an annular part 32, first contact parts 33 and third pressing parts 34. The cylindrical part 31 is fixed to the output shaft (not shown in the drawings) coupled to the transmission. The annular part 32 is integrally formed with the outer peripheral part of the cylindrical part 31. The first contact parts 33 are formed on the outer peripheral part of the annular part 32. The first contact parts 33 are contactable to the support plate 4 (second contact parts 42 to be described).

Each third pressing part 34 presses at least either of one low stiffness spring 51 and one high stiffness spring 61. Each third pressing part 34 extends radially outward from the annular part 32 and is integrally formed with the annular part 32. Further, a first extension part 35 is formed on the outer peripheral part of each third pressing part 34 to extend in the circumferential direction. The first extension part 35 is disposed on the outer peripheral side of the low stiffness spring 51 and the high stiffness spring 61. Specifically, the first extension part 35 is disposed on the outer peripheral side of one end of the low stiffness spring 51 through one spring sheet, while being disposed on the outer peripheral side of one end of the high stiffness spring 61 through another spring sheet. With the construction, the first extension part 35 restricts the low stiffness spring 51 and the high stiffness spring 61 from moving to the outer peripheral side.

Support Plate

The support plate 4 is engaged with the low stiffness springs 51 and the high stiffness springs 61. The support plate 4 couples each pair of the low stiffness spring 51 and the high stiffness spring 61 in series.

The support plate 4 has an annular body 41 (see FIG. 2), the second contact parts 42, engaging parts 43 and the rotation restriction parts 44. The body 41 is disposed on the inner peripheral side of the low stiffness springs 51 and the high stiffness springs 61. The second contact parts 42 are formed on the outer peripheral part of the body 41. The second contact parts 42 are contactable to the output plate 3. When described in detail, the second contact parts 42 are respectively disposed to be circumferentially opposed to the first contact parts 33 of the output plate 3. The second contact parts 42 are respectively contactable to the opposed first contact parts 33 of the output plate 3.

Each engaging part 43 is disposed between one low stiffness spring 51 and one high stiffness spring 61. Each engaging part 43 is engaged with one end of the low stiffness spring 51 and that of the high stiffness spring 61. When described in detail, each engaging part 43 is engaged with one end of the low stiffness spring 51 through one spring sheet, while being engaged with one end of the high stiffness spring 61 through another spring sheet. The engaging parts 43 extend radially outward from the body 41 and are integrally formed with the body 41. The engaging parts 43 and the third pressing parts 34 of the output plate 3 are disposed to be alternately aligned in the circumferential direction.

Further, a second extension part 45 is formed on the outer peripheral part of each engaging part 43 to extend in the circumferential direction. The second extension part 45 is disposed on the outer peripheral side of the low stiffness spring 51 and the high stiffness spring 61. Specifically, the second extension part 45 is disposed on the outer peripheral side of the one end of the low stiffness spring 51 through the aforementioned one spring sheet, while being disposed on the outer peripheral side of the one end of the high stiffness spring 61 through the aforementioned another spring sheet. Thus, the second extension part 45 restricts the low stiffness spring 51 and the high stiffness spring 61 from moving to the outer peripheral side.

The rotation restriction parts 44 restrict rotation of the support plate 4. Each rotation restriction part 44 is formed on each engaging part 43. When described in detail, each rotation restriction part 44 protrudes radially outward from each engaging part 43 and is integrally formed with each engaging part 43. The rotation restriction parts 44 are contactable to some of the coupling members 23 of the input plate 2. The rotation restriction parts 44 restrict rotation of the support plate 4 by making contact with some of the coupling members 23 of the input plate 2.

Low Stiffness Springs

The low stiffness springs 51 are configured to be circumferentially compressed between the input plate 2 and the output plate 3. When described in detail, each low stiffness spring 51 is configured to be compressed between each first pressing part 27 of the first and second plates 21 and 22 and each third pressing part 34 of the output plate 3. When described in more detail, each low stiffness spring 51 is configured to be compressed between each first pressing part 27 of the first and second plates 21 and 22 and each engaging part 43 of the support plate 4. Each low stiffness spring 51 is also configured to be compressed between each third pressing part 34 of the output plate 3 and each engaging part 43 of the support plate 4.

In each pair of the springs 51 and 61, the low stiffness spring 51 is disposed in series with the high stiffness spring 61. When described in detail, the low stiffness spring 51 is disposed in series with the high stiffness spring 61 through the support plate 4. The stiffness of the low stiffness spring 51 is less than that of the high stiffness spring 61. When the low stiffness spring 51 and the high stiffness spring 61 are compressed, the amount of compression is greater in the low stiffness spring 51 than in the high stiffness spring 61, because the low stiffness spring 51 is herein disposed in series with the high stiffness spring 61, and further, the stiffness of the low stiffness spring 51 is less than that of the high stiffness spring 61.

High Stiffness Springs

The high stiffness springs 61 are configured to be circumferentially compressed between the input plate 2 and the output plate 3. When described in detail, each high stiffness spring 61 is configured to be compressed between each second pressing part 28 of the first and second plates 21 and 22 and each third pressing part 34 of the output plate 3. When described in detail, each high stiffness spring 61 is configured to be compressed between each second pressing part 28 of the first and second plates 21 and 22 and each engaging part 43 of the support plate 4. Each high stiffness spring 61 is also configured to be compressed between each third pressing part 34 of the output plate 3 and each engaging part 43 of the support plate 4.

In each pair of the springs 51 and 61, the high stiffness spring 61 is disposed in series with the low stiffness spring 51. When described in detail, the high stiffness spring 61 is disposed in series with the low stiffness spring 51 through the support plate 4. The stiffness of the high stiffness spring 61 is greater than that of the low stiffness spring 51. When the low stiffness spring 51 and the high stiffness spring 61 are compressed, the amount of compression is smaller in the high stiffness spring 61 than in the low stiffness spring 51, because the high stiffness spring 61 is herein disposed in series with the low stiffness spring 51, and further, the stiffness of the high stiffness spring 61 is greater than that of the low stiffness spring 51.

First Stopper Mechanism

The first stopper mechanism 81 is configured to deactivate the low stiffness springs 51 by causing the support plate 4 and one of the input plate 2 and the output plate 3 to contact each other.

In detail, when the input plate 2 is rotated in a first direction (an R1 direction in FIG. 1), the first stopper mechanism 81 is configured to deactivate the low stiffness springs 51 by causing the support plate 4 and the output plate 3 to contact each other. Contrarily, when the input plate 2 is rotated in a second direction (an R2 direction in FIG. 1), the first stopper mechanism 81 is configured to deactivate the low stiffness springs 51 by causing the support plate 4 and the input plate 2 to contact each other.

In the former condition, when described in more detail, the first stopper mechanism 81 is composed of the first contact parts 33 of the output plate 3 and the second contact parts 42 of the support plate 4. In the first stopper mechanism 81, when the input plate 2 is rotated in the first direction (the R1 direction in FIG. 1), the second contact part 42 (42a in FIG. 1) of the support plate 4, which is disposed on the inner peripheral side of each low stiffness spring 51, makes contact with its opposed first contact part 33 (33a in FIG. 1) of the output plate 3. Accordingly, each low stiffness spring 51 is configured to be deactivated.

On the other hand, in the latter condition, the first stopper mechanism 81 is composed of some of the coupling members 23 of the input plate 2 and the rotation restriction parts 44 of the support plate 4. In the first stopper mechanism 81, when the input plate 2 is rotated in the second direction (the R2 direction in FIG. 1), the coupling member 23 (23a in FIG. 1) of the input plate 2, which is disposed on the outer peripheral side of each low stiffness spring 51, contacts each rotation restriction part 44 of the support plate 4. Accordingly, each low stiffness spring 51 is configured to be deactivated.

Second Stopper Mechanism

The second stopper mechanism 85 is configured to deactivate the high stiffness springs 61 by causing the support plate 4 and the other of the input plate 2 and the output plate 3 to contact each other.

In detail, when the input plate 2 is rotated in the first direction (the R1 direction in FIG. 1), the second stopper mechanism 85 is configured to deactivate the high stiffness springs 61 by causing the support plate 4 and the input plate 2 to contact each other. Contrarily, when the input plate 2 is rotated in the second direction (the R2 direction in FIG. 1), the second stopper mechanism 85 is configured to deactivate the high stiffness springs 61 by causing the support plate 4 and the output plate 3 to contact each other.

In the former condition, when described in more detail, the second stopper mechanism 85 is composed of some of the coupling members 23 of the input plate 2 and the rotation restriction parts 44 of the support plate 4. In the second stopper mechanism 85, when the input plate 2 is rotated in the first direction (the R1 direction in FIG. 1), the coupling member 23 (23b in FIG. 1) of the input plate 2, which is disposed on the outer peripheral side of each high stiffness spring 61, contacts each rotation restriction part 44 of the support plate 4. Accordingly, each high stiffness spring 61 is configured to be deactivated.

On the other hand, in the latter condition, the second stopper mechanism 85 is composed of the first contact parts 33 of the output plate 3 and the second contact parts 42 of the support plate 4. In the second stopper mechanism 85, when the input plate 2 is rotated in the second direction (the R2 direction in FIG. 1), the second contact part 42 (42b in FIG. 1) of the support plate 4, which is disposed on the inner peripheral side of each high stiffness spring 61, contacts its opposed first contact part 33 (33b in FIG. 1) of the output plate 3. Accordingly, each high stiffness spring 61 is configured to be deactivated.

First Shock Absorber Members

The first shock absorber members 71 are capable of relieving activation of the first stopper mechanism 81 during activation of the low stiffness springs 51. The first shock absorber members 71 are elastic members. Specifically, the first shock absorber members 71 are elastic members made of resin. It should be noted that in the following explanation, the term "torsion angle" may be used as a meaning of "an absolute value of torsion angle".

Each first shock absorber member 71 is movably disposed inside each low stiffness spring 51. Each first shock absorber member 71 becomes compressible inside each low stiffness spring 51 when a torsion angle $\theta$ (an exemplary rotary angle) of the output plate 3 relative to the input plate 2 becomes a predetermined first angle $\theta 1$ (see FIG. 3) or greater. The predetermined first angle $\theta 1$ is less than a torsion angle $\theta 2$ (see FIG. 3) at which the first stopper mechanism 81 is activated.

In detail, the first shock absorber members 71 become compressible between the support plate 4 and one of the input plate 2 and the output plate 3 when the torsion angle $\theta$ of the output plate 3 relative to the input plate 2 is greater than or equal to the predetermined first angle $\theta 1$ and less than the torsion angle $\theta 2$ at which the first stopper mechanism 81 is activated. For example, each first shock absorber member 71 is compressible between each engaging part 43 of the support plate 4 and each first pressing part 27 of the first and second plates 21 and 22. Each first shock absorber member 71 is also compressible between each engaging part 43 of the support plate 4 and each third pressing part 34 of the output plate 3. It should be noted that the predetermined first angle θ1 is smaller than the torsion angle θ2 at which the first stopper mechanism 81 is activated.

In the aforementioned condition, even when large torque is abruptly inputted into the input plate 2, the first shock absorber members 71 hinder the first stopper mechanism 81 from being activated. Further, in activation of the first stopper mechanism 81, the first shock absorber members 71 also lessen activation sounds of the first stopper mechanism 81.

Second Shock Absorber Members

The second shock absorber members 75 are capable of relieving activation of the second stopper mechanism 85 during activation of the high stiffness springs 61. The second shock absorber members 75 are elastic members. Specifically, the second shock absorber members 75 are elastic members made of resin.

Each second shock absorber member 75 is movably disposed inside each high stiffness spring 61. Each second shock absorber member 75 becomes compressible inside each high stiffness spring 61 when the torsion angle θ of the output plate 3 relative to the input plate 2 becomes a predetermined second angle θ3 (see FIG. 3) or greater. The predetermined second angle θ3 is less than a torsion angle θ4 at which the second stopper mechanism 85 is activated. It should be noted that strictly speaking, the term "torsion angle" is interpreted as "an absolute value of torsion angle" because the torsion angle is herein a real number.

In detail, the second shock absorber members 75 become compressible between the support plate 4 and one of the input plate 2 and the output plate 3 when the torsion angle θ of the output plate 3 relative to the input plate 2 is greater than or equal to the predetermined second angle θ3 and less than the torsion angle θ4 at which the second stopper mechanism 85 is activated. For example, each second shock absorber member 75 is compressible between each engaging part 43 of the support plate 4 and each second pressing part 28 of the first and second plates 21 and 22. Each second shock absorber member 75 is also compressible between each engaging part 43 of the support plate 4 and each third pressing part 34 of the output plate 3. It should be noted that the predetermined second angle θ3 is smaller than the torsion angle θ4 at which the second stopper mechanism 85 is activated.

In the aforementioned condition, even when large torque is abruptly inputted into the input plate 2, the second shock absorber members 75 hinder the second stopper mechanism 85 from being activated. Further, in activation of the second stopper mechanism 85, the second shock absorber members 75 also lessen activation sounds of the second stopper mechanism 85.

Positioning Structure

The positioning structure 90 radially positions the support plate 4 with respect to at least either of the input plate 2 and the output plate 3 on the inner peripheral side. The positioning structure 90 herein radially positions the support plate 4 with respect to the input plate 2 on the inner peripheral side.

In the positioning structure 90, an inner peripheral part 46 of the support plate 4 is positioned by the input plate 2. The positioning structure 90 is composed of the inner peripheral part 46 of the support plate 4 and a support part. The support part is the aforementioned reinforcement member 24. Specifically, the inner part (i.e., the inner peripheral part 46) of the annular body 41 of the support plate 4 is positioned by the reinforcement member 24 mounted to the input plate 2. More specifically, the support plate 4 is radially positioned with respect to the first input plate 2 by causing the inner part 46 of the annular body 41 of the support plate 4 to contact the outer peripheral part of the reinforcement member (e.g., a spacer) 24 mounted to the coupling parts 21a of the first plate 21. In other words, the reinforcement member (e.g., a spacer) 24 functions as the support part for supporting the inner peripheral part 46 of the support plate 4 as well as a reinforcement part for reinforcing the coupling parts 21a of the first plate 21.

Under the condition that the support plate 4 is thus radially positioned by the positioning structure 90, the flywheel assembly 1 is configured to be activated as described below.

Actions of Flywheel Assembly

Figure 3:
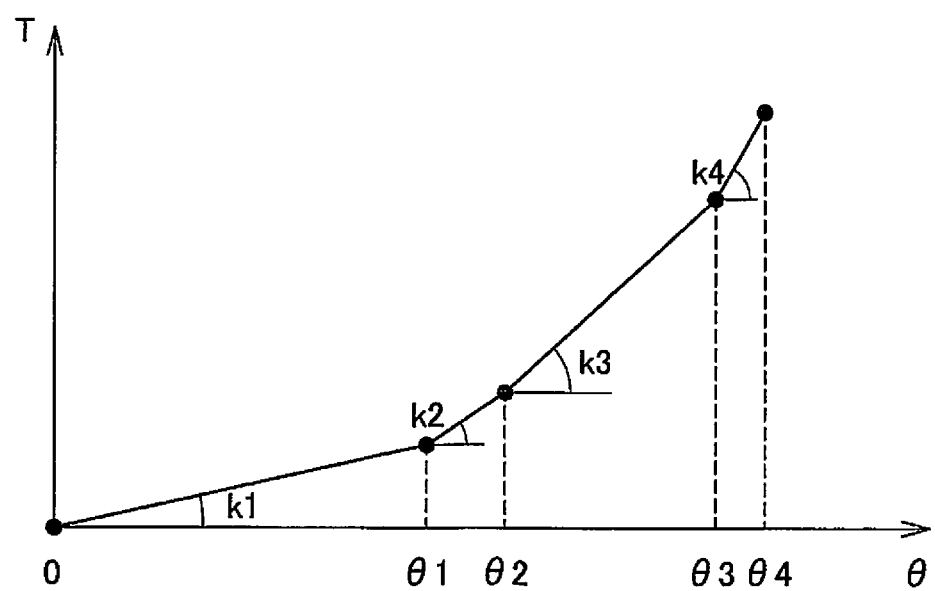
FIG. 3 is a diagram for representing torsional characteristics of the flywheel assembly.

Actions (torsional characteristics) of the flywheel assembly 1 will be explained with reference to FIG. 3. In FIG. 3, the horizontal axis indicates the torsion angle θ, whereas the vertical axis indicates torque. It should be noted that the flywheel assembly 1 according to the present preferred embodiment includes three groups of springs, i.e., three pairs of the low stiffness spring 51 and the high stiffness spring 61 that are disposed in series. Each group of springs is thus composed of the low stiffness spring 51 and the high stiffness spring 61. In the following explanation, an arbitrary pair of the springs 51 and 61 will be focused for easy understanding.

Positive-side Torsional Characteristics

First, power of the engine is inputted into the flywheel assembly 1, and in turn, the input plate 2 begins to be rotated with respect to the output plate 3 in the first direction (the R1 direction in FIG. 1). Accordingly, the low stiffness spring 51 and the high stiffness spring 61 begin to be compressed between the input plate 2 and the output plate 3.

Then, the high stiffness spring 61 and the low stiffness spring 51 are compressed between the input plate 2 and the output plate 3 through the support plate 4. When described in detail, the high stiffness spring 61 is compressed between the relevant second pressing part 28 of the input plate 2 and the relevant engaging part 43 of the support plate 4 through the spring sheets. On the other hand, the low stiffness spring 51 is compressed between the engaging part 43 of the support plate 4 and the relevant third pressing part 34 of the output plate 3 through the spring sheets. Accordingly, a first stage torsional stiffness K1 is formed as shown in FIG. 3.

Subsequently, when the torsion angle θ increases, the first shock absorber member 71 disposed inside the low stiffness spring 51 becomes contactable to the spring sheets. At this time, the torsion angle θ is θ1. The first shock absorber member 71 herein becomes compressible between the engaging part 43 of the support plate 4 and the third pressing part 34 of the output plate 3 through the spring sheets. In other words, the low stiffness spring 51 and the first shock absorber member 71 are herein compressed. Accordingly, a second stage torsional stiffness K2 is formed as shown in FIG. 3.

When the torsion angle θ further increases and reaches θ2 under the condition, the first stopper mechanism 81 is activated. When described in detail, on the inner peripheral side of the low stiffness spring 51, the relevant second contact part 42 of the support plate 4 contacts the relevant first contact part 33 of the output plate 3. Accordingly, the low stiffness spring 51 is deactivated.

Next, when the torsion angle θ further increases, only the high stiffness spring 61 is compressed between the input plate 2 and the output plate 3. When described in detail, the high stiffness spring 61 is compressed between the second pressing part 28 of the input plate 2 and the engaging part 43 of the support plate 4 through the spring sheets. Accordingly, a third stage torsional stiffness K3 is formed as shown in FIG. 3.

Subsequently, when the torsion angle θ increases, the second shock absorber member 75 disposed inside the high stiffness spring 61 becomes contactable to the spring sheets. At this time, the torsion angle θ is θ3. The second shock absorber member 75 herein becomes compressible between the second pressing part 28 of the input plate 2 and the engaging part 43 of the support plate 4 through the spring sheets. In other words, the high stiffness spring 61 and the second shock absorber member 75 are herein compressed. Accordingly, a fourth stage torsional stiffness K4 is formed as shown in FIG. 3.

When the torsion angle θ further increases under the condition, the second stopper mechanism 85 is activated. When described in detail, the coupling member 23 of the input plate 2, which is disposed on the outer peripheral side of the high stiffness spring 61, contacts the relevant rotation restriction part 44 of the support plate 4. Accordingly, the high stiffness spring 61 is deactivated. This is a condition that the torsion angle θ has reached the maximum torsion angle θ4.

Negative-side Torsional Characteristics

Negative-side torsional characteristics are substantially the same as the positive-side torsional characteristics, and therefore, will be explained with reference to FIG. 3. Specifically, where the torsion angle θ is set as an absolute value in FIG. 3, FIG. 3 can be considered as a diagram for representing the negative-side torsional characteristics.

First, power of the engine is inputted into the flywheel assembly 1, and in turn, the input plate 2 begins to be rotated with respect to the output plate 3 in the second direction (the R2 direction in FIG. 1). Accordingly, the low stiffness spring 51 and the high stiffness spring 61 begin to be compressed between the input plate 2 and the output plate 3.

Then, the high stiffness spring 61 and the low stiffness spring 51 are compressed between the input plate 2 and the output plate 3 through the support plate 4. When described in detail, the low stiffness spring 51 is compressed between the relevant first pressing part 27 of the input plate 2 and the relevant engaging part 43 of the support plate 4 through the spring sheets. On the other hand, the high stiffness spring 61 is compressed between the engaging part 43 of the support plate 4 and the relevant third pressing part 34 of the output plate 3 through the spring sheets. Accordingly, the first stage torsional stiffness K1 is formed as shown in FIG. 3.

Subsequently, when the torsion angle θ increases, the first shock absorber member 71 disposed inside the low stiffness spring 51 becomes contactable to the spring sheets. At this time, the torsion angle θ is θ1. The first shock absorber member 71 herein becomes compressible between the engaging part 43 of the support plate 4 and the first pressing part 27 of the input plate 2 through the spring sheets. In other words, the low stiffness spring 51 and the first shock absorber member 71 are herein compressed. Accordingly, the second stage torsional stiffness K2 is formed as shown in FIG. 3.

When the torsion angle θ further increases and reaches θ2 under the condition, the first stopper mechanism 81 is activated. When described in detail, the coupling member 23 of the input plate 2, which is disposed on the outer peripheral side of the low stiffness spring 51, contacts the relevant rotation restriction part 44 of the support plate 4. Accordingly, the low stiffness spring 51 is deactivated.

Next, when the torsion angle θ further increases, only the high stiffness spring 61 is compressed between the input plate 2 and the output plate 3. When described in detail, the high stiffness spring 61 is compressed between the third pressing part 34 of the output plate 3 and the engaging part 43 of the support plate 4 through the spring sheets. Accordingly, the third stage torsional stiffness K3 is formed as shown in FIG. 3.

Subsequently, when the torsion angle θ increases, the second shock absorber member 75 disposed inside the high stiffness spring 61 becomes contactable to the spring sheets. At this time, the torsion angle θ is θ3. The second shock absorber member 75 herein becomes compressible between the engaging part 43 of the support plate 4 and the third pressing part 34 of the output plate 3 through the spring sheets. In other words, the high stiffness spring 61 and the second shock absorber member 75 are herein compressed. Accordingly, the fourth stage torsional stiffness K4 is formed as shown in FIG. 3.

When the torsion angle θ further increases under the condition, the second stopper mechanism 85 is activated. When described in detail, on the inner peripheral side of the high stiffness spring 61, the relevant second contact part 42 of the support plate 4 contacts the relevant first contact part 33 of the output plate 3. Accordingly, the high stiffness spring 61 is deactivated. This is a condition that the torsion angle θ has reached the maximum torsion angle θ4.

Second Exemplary Embodiment

Figure 4:
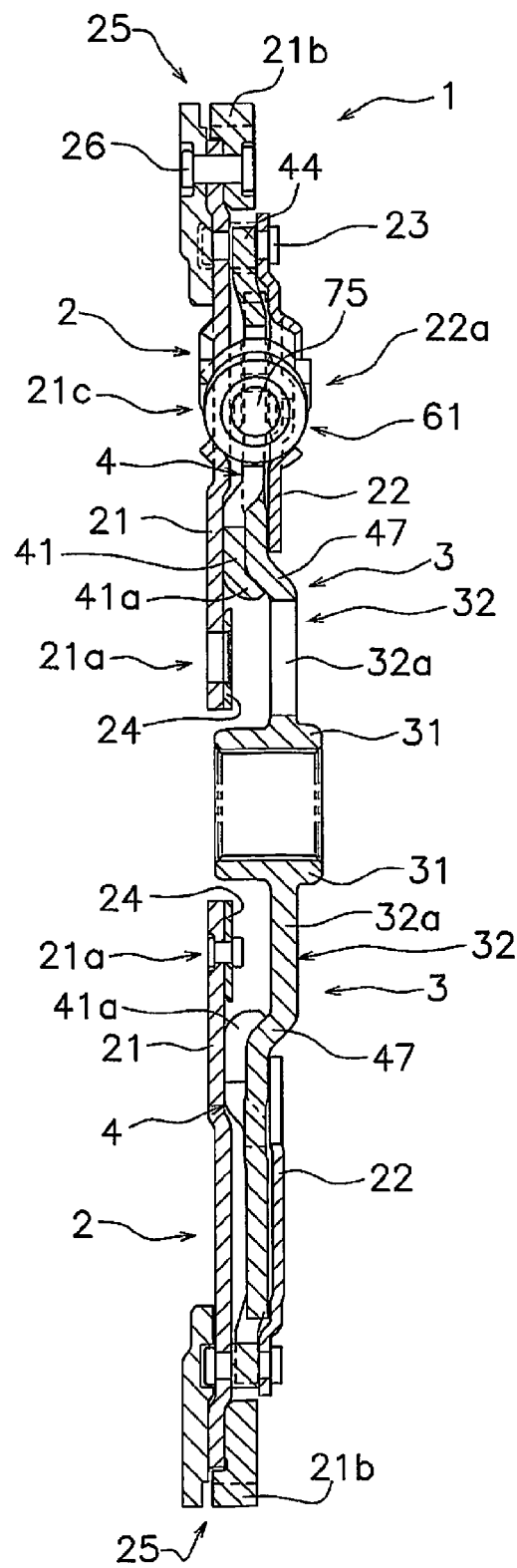
FIG. 4 is a cross-sectional view of a flywheel assembly according to a second exemplary embodiment of the present invention.

The flywheel assembly 1 (an exemplary damper device) according to a second exemplary embodiment will be hereinafter explained with reference to FIG. 4. The construction and the action of the flywheel assembly 1 according to the second exemplary embodiment are the same as those of the flywheel assembly 1 according to the first exemplary embodiment except for the positioning structure 90. Thus, the construction of the positioning structure 90 will be hereinafter explained in detail, whereas the construction unrelated to the positioning structure 90 will be briefly explained or will not be explained. Further, explanation to be hereinafter undescribed conforms to that of the first exemplary embodiment. It should be noted that in FIG. 4, reference signs assigned to elements am the same as those assigned to their corresponding elements in the first exemplary embodiment.

Output Plate

The output plate 3 outputs the power of the engine to the transmission. The output plate 3 is disposed to be rotatable with respect to the input plate 2.

The output plate 3 has the cylindrical part 31, the annular part 32, the first contact parts 33 (see FIG. 1) and the third pressing parts 34 (see FIG. 1). It should be noted that the cylindrical part 31, the first contact parts 33 and the third pressing parts 34 have same constructions as those in the first exemplary embodiment, and therefore, will not be hereinafter explained.

The annular part 32 is integrally formed with the outer peripheral part of the cylindrical part 31. The annular part 32 has a base end part 32a and the support part 47. The base end part 32a is integrally formed with the outer peripheral part of the cylindrical part 31. The support part 47 is integrally formed with the outer peripheral part of the base end part 32a. Specifically, the base end part 32a extends radially outward from the cylindrical part 31. The support part 47 bends from the outer peripheral part of the base end part 32a to the engine side. The support part 47 is capable of supporting a protruding part 41a (to be described) of the support plate 4. When described in detail, the inner peripheral part of the support part 47, for instance, the support-plate-4 side surface (i.e., the engine side surface) of the support part 47, is capable of supporting the outer peripheral part of the protruding part 41a of the support plate 4.

Support Plate

The support plate 4 is engaged with the low stiffness springs 51 and the high stiffness springs 61. The support plate 4 couple each pair of the low stiffness spring 51 and the high stiffness spring 61 in series. The support plate 4 has the annular body 41, the protruding part 41a, the second contact parts 42 (see FIG. 1), the engaging parts 43 (see FIG. 1) and the rotation restriction parts 44. It should be noted that the second contact parts 42, the engaging parts 43 and the rotation restriction parts 44 have the same constructions as those in the first exemplary embodiment, and therefore, will not be hereinafter explained.

The annular body 41 is disposed on the inner peripheral side of the low stiffness springs 51 and the high stiffness springs 61. The protruding part 41a axially protrudes from the body 41. When described in detail, the protruding part 41a protrudes from the body 41 toward the output plate 3. Put differently, the protruding part 41a protrudes from the body 41 to the axially transmission side. The protruding part 41a is formed by bending the inner peripheral part of the body 41 toward the output plate 3. Specifically, the protruding part 41a is formed by burring of the inner peripheral part of the body 41.

The outer peripheral part of the protruding part 41a is supported by the inner peripheral part of the support part 47 of the output plate 3. Specifically, the output-plate-3 side surface (i.e., the transmission side surface) of the protruding part 41a is supported by the support-plate-4 side surface (i.e., the engine side surface) of the support part 47 of the output plate 3. More specifically, the outer peripheral part of the protruding part 41a is supported by the inner peripheral part of the support part 47 of the output plate 3 by causing the output-plate-3 side surface of the protruding part 41a to contact the support-plate-4 side surface of the support part 47 of the output plate 3.

Positioning Structure

The positioning structure 90 is configured to radially position the support plate 4 with respect to at least either of the input plate 2 and the output plate 3 on the inner peripheral side. Specifically, the positioning structure 90 is herein configured to radially position the support plate 4 with respect to the output plate 3 on the inner peripheral side.

Put differently, the inner peripheral part of the support plate 4 is positioned by the output plate 3 in the positioning structure 90. The positioning structure 90 is composed of the support part 47 of the output plate 3 and the protruding part 41a of the support plate 4. The protruding part 41a of the support plate 4 is positioned by the support part 47 of the output plate 3. Specifically, the support plate 4 is radially positioned with respect to the output plate 3 by causing the output-plate-3 side surface of the protruding part 41a of the support plate 4 to contact the support-plate-4 side surface of the support part 47 of the output plate 3. Thus, when centrifugal force acts on the support plate 4, the support part 47 of the output plate 3 restricts radial movement of the support plate 4.

Under the condition that the support plate 4 is thus radially positioned by the positioning structure 90, the flywheel assembly 1 is configured to be activated as described above.

The present exemplary flywheel assembly 1 (the damper device) includes the input plate 2, the output plate 3, the low-stiffness and high-stiffness springs 51 and 61, the support plate 4 and the positioning structure 90. The input plate 2 is a member into which the power of the engine is inputted. The output plate 3 is disposed to be rotatable with respect to the input plate 2. The low-stiffness and high-stiffness springs 51 and 61 are configured to be compressed between the input plate 2 and the output plate 3. The support plate 4 is engaged with the respective low-stiffness and high-stiffness springs 51 and 61, and couples the low-stiffness and high-stiffness springs 51 and 61. The positioning structure 90 radially positions the support plate 4 with respect to at least either of the input plate 2 and the output plate 3 on the inner peripheral side.

In the present exemplary flywheel assembly 1 (the damper device), when inputted into the input plate 2, the power of the engine is sequentially transmitted to the input plate 2, the support plate 4 and the output plate 3 in this order. In the power transmission path, the low-stiffness and high-stiffness springs 51 and 61 are configured to be compressed between the input plate 2 and the output plate 3 through the support plate 4, while the positioning structure 90 radially positions the support plate 4.

Thus in the present exemplary flywheel assembly 1 (the damper device), the positioning structure 90 radially positions the support plate 4. Hence, the low-stiffness and high-stiffness springs 51 and 61 can be stably compressed. Put differently, the damper device can be stably activated.

In the present exemplary flywheel assembly 1 (the damper device), the input plate 2 is provided with the support part 24 for supporting the inner peripheral part 46 of the support plate 4. Further, the positioning structure 90 is formed by the inner peripheral part 46 of the support plate 4 and the support part 24.

In the present exemplary flywheel assembly 1 (the damper device), the support part 24 provided for the input plate 2 supports the inner peripheral part 46 of the support plate 4. In other words, the positioning structure 90 radially positions the support plate 4. Thus, the low-stiffness and high-stiffness springs 51 and 61 can be stably compressed. Put differently, the damper device can be stably activated.

In the present exemplary flywheel assembly 1 (the damper device), the input plate 2 has the coupling parts 21a for coupling the input plate 2 to the engine. Further, the support part 24 is a reinforcement member for reinforcing the coupling parts 21a.

In the present exemplary flywheel assembly 1 (the damper device), the reinforcement member 24 provided for the input plate 2 supports the inner peripheral part 46 of the support plate 4. By thus using the reinforcement member 24 as the positioning structure 90, the support plate 4 can be radially positioned without preparing a special member.

In the present exemplary flywheel assembly 1 (the damper device), the support plate 4 has the body 41 and the protruding part 41a axially protruding from the body 41. Further, the output plate 3 has the support part 47 capable of supporting the protruding part 41a. Yet further, the positioning structure 90 is formed by the protruding part 41a and the support part 47.

In the present exemplary flywheel assembly 1 (the damper device), the support part 47 of the output plate 3 supports the protruding part 41a of the support plate 4. In other words, the positioning structure 90 radially positions the support plate 4. Thus, the low-stiffness and high-stiffness springs 51 and 61 can be stably compressed. Put differently, the damper device can be stably activated.

In the present exemplary flywheel assembly 1 (the damper device), the protruding part 41a is formed by bending the inner peripheral part of the body 41. Further, the inner peripheral part of the support part 47 supports the outer peripheral part of the protruding part 41a.

In the present exemplary flywheel assembly 1 (the damper device), the protruding part 41a can be easily formed only by bending the inner peripheral part of the body 41. Put differently, the support plate 4 can be easily positioned in the radial direction without preparing a special member.

Moreover, the inner peripheral part of the support part 47 of the output plate 3 supports the outer peripheral part of the protruding part 41a of the support plate 4. Put differently, even when centrifugal force acts on the support plate 4, the inner peripheral part of the support part 47 of the output plate 3 restricts (radial) movement of the outer peripheral part of the protruding part 41a of the support plate 4. Even with the construction, the support plate 4 can be radially positioned by the positioning structure 90.

In the present exemplary flywheel assembly 1 (the damper device), the input plate 2, the support plate 4 and the output plate 3 are disposed on the inner peripheral side so as to be axially aligned in the sequential order of the input plate 2, the support plate 4 and the output plate 3.

In the present exemplary flywheel assembly 1 (the damper device), the input plate 2, the support plate 4 and the output plate 3 are disposed to be axially aligned in this order. Put differently, the input plate 2, the support plate 4 and the output plate 3, composing the present flywheel assembly 1 (the damper device), can be respectively formed with simple shapes in comparison with a construction that these members are disposed to be aligned in a sequential order of the input plate 2, the output plate 3 and the support plate 4. Thus, reduction in weight of the damper device can be achieved.

Other Exemplary Embodiments

The present invention is not limited to the aforementioned exemplary embodiments, and a variety of changes and modifications can be made without departing from the scope of the present invention.

The aforementioned first exemplary embodiment has exemplified the construction that the support plate 4 is supported and positioned by the reinforcement member (e.g., a spacer) 24. Alternatively, a protruding part may be formed on the inner peripheral part of the first plate 21 to be located radially outward of the reinforcement member (e.g., a spacer) 24. In the construction, the support plate 4 can be radially positioned by causing the inner peripheral part 46 of the support plate 4 to contact the protruding part of the first plate 21.

The aforementioned second exemplary embodiment has exemplified the construction that the protruding part 41a of the support plate 4 is formed by bending the inner peripheral part of the support plate 4 (i.e., the inner part of the body 41) toward the output plate 3. However, the protruding part 41a of the support plate 4 may have an arbitrary suitable shape. In other words, the protruding part 41a of the support plate 4 may have an arbitrary shape as long as the protruding part 41a of the support plate 4 is opposed to the support part 47 of the output plate 3. For example, the protruding part 41a of the support plate 4 may be integrally formed with the inner peripheral part of the support plate 4 without being formed by bending the inner peripheral part of the support plate 4.

The exemplary embodiments of the present invention are widely applicable to damper devices.

What is claimed is:

1. A damper device, comprising:
a first rotary member into which a power of an engine is inputted;
a second rotary member disposed to be rotatable with respect to the first rotary member;
a plurality of coil springs configured to be compressed between the first rotary member and the second rotary member, the plurality of coil springs receiving a torque of the first rotary member and directly transmitting the torque to the second rotary member;
an intermediate member configured to engage the plurality of coil springs and to couple the plurality of coil springs together; and
a positioning structure configured to position radially the intermediate member with respect to at least one of the first rotary member and the second rotary member on an inner peripheral side.

2. The damper device according to claim 1, wherein
the first rotary member is provided with a support part for supporting an inner peripheral part of the intermediate member, and
the positioning structure is configured by the inner peripheral part of the intermediate member and the support part.

3. The damper device according to claim 2, wherein
the first rotary member has a coupling part for coupling the first rotary member to the engine, and
the support part is a reinforcement member for reinforcing the coupling part.

4. The damper device according to claim 1, wherein
the intermediate member has a body and a protruding part axially protruding from the body,
the second rotary member has a support part, the support part being configured to support the protruding part, and
the positioning structure is configured by the protruding part and the support part.

5. The damper device according to claim 4, wherein
the protruding part is formed by bending an inner peripheral part of the body, and
an inner peripheral part of the support part supports an outer peripheral part of the protruding part.

6. The damper device according to claim 1, wherein
the first rotary member, the intermediate member and the second rotary member are disposed on the inner peripheral side to be axially aligned in a sequential order of the first rotary member, the intermediate member and the second rotary member.

7. The damper device according to claim 5, wherein
the first rotary member, the intermediate member and the second rotary member are disposed on the inner peripheral side to be axially aligned in a sequential order of the first rotary member, the intermediate member and the second rotary member.

8. The damper device according to claim 1, wherein
the intermediate member is rotatable relative to the first and second rotary members when transmitting the torque from the first rotary member to the second rotary member.

* * * * *